United States Patent
Hess et al.

(10) Patent No.: US 8,672,018 B2
(45) Date of Patent: Mar. 18, 2014

(54) CYLINDER HEAD AND METHOD

(75) Inventors: Devin R. Hess, Burton, MI (US);
Gerald F. Johnson, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/589,216

(22) Filed: Aug. 20, 2012

(65) Prior Publication Data

US 2014/0048033 A1 Feb. 20, 2014

(51) Int. Cl.
*B22D 19/00* (2006.01)
*B22D 19/16* (2006.01)
*F02B 75/08* (2006.01)

(52) U.S. Cl.
USPC .............. 164/98; 164/112; 164/100; 164/95; 123/668

(58) Field of Classification Search
USPC ..................... 123/193.5; 29/888.06
See application file for complete search history.

(56) References Cited

U.S. PATENT DOCUMENTS

| 3,786,795 | A | * | 1/1974 | Kaneko et al. | 123/193.5 |
| 4,202,709 | A | * | 5/1980 | Shibamori et al. | 148/531 |
| 4,487,175 | A | * | 12/1984 | Krczal | 123/193.5 |
| 5,787,853 | A | * | 8/1998 | Adachi et al. | 123/193.5 |
| 8,152,942 | B2 | * | 4/2012 | Ogino et al. | 148/525 |

* cited by examiner

*Primary Examiner* — Lindsay Low
*Assistant Examiner* — Syed O Hasan
(74) *Attorney, Agent, or Firm* — Quinn Law Group, PLLC

(57) ABSTRACT

A cylinder head is formed by positioning a clad preform including a first and second layer in a casting die cavity with the second layer in communication with the die cavity and the first layer facing outwardly to define a combustion surface. Molten material provided to the die cavity is solidified to form a cast portion metallurgically bonded to the second layer. An aperture of the preform forms a port in fluid communication with a passage of the cast portion. A plurality of dome-shaped preforms may define the combustion chambers of a cylinder head formed by the method. The preform may define a cylinder head face. The first layer may be a steel-based layer, and the second layer and cast portion may be aluminum-based, such that the first layer and combustion surface has higher thermal fatigue strength relative to the cast portion.

20 Claims, 3 Drawing Sheets

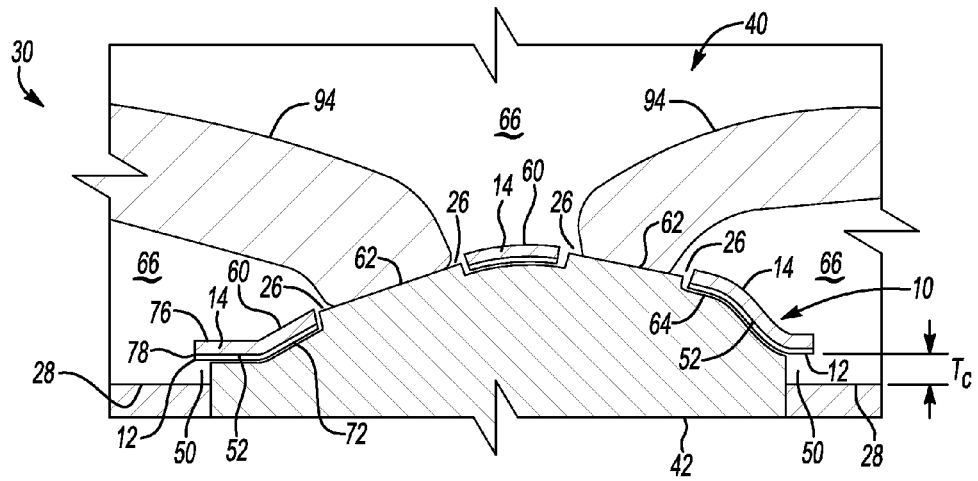
*Fig-3*
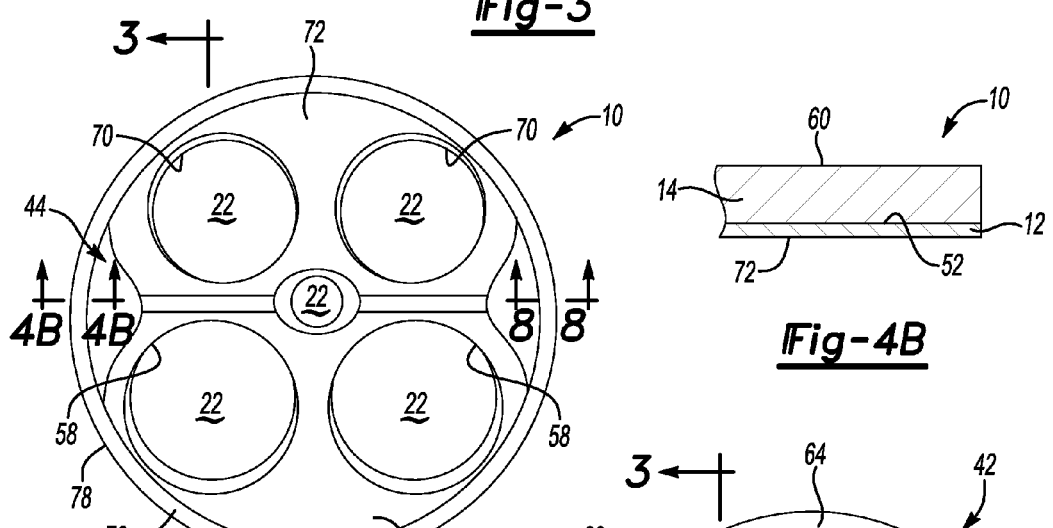
*Fig-4A*  *Fig-4B*
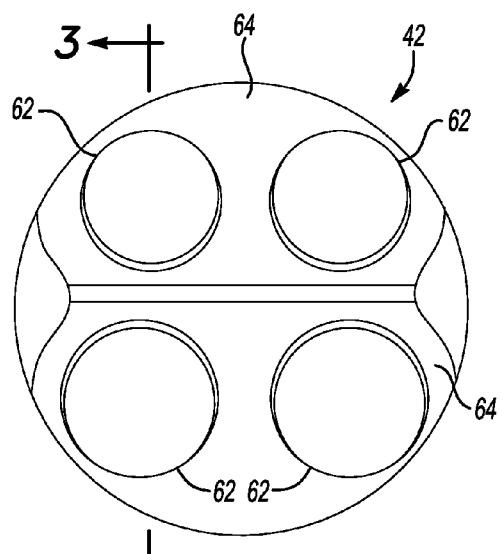
*Fig-5*

CYLINDER HEAD AND METHOD

TECHNICAL FIELD

The present invention relates to a cylinder head and a method of forming a cylinder head.

BACKGROUND

Exhaust gases produced during combustion of fuel in a combustion chamber of an internal combustion engine generate highly elevated temperatures, temperature nonuniformities and heat fluxes in the combustion chamber, which lead to thermal stress of the combustion surface of the combustion chamber and a reduction or deterioration of mechanical properties of the combustion chamber surface. Thermal stress may result from expansion and contraction of the combustion chamber surface and adjacent material resulting from changes in temperature in the combustion chamber and cooling passages in the cylinder head and thermal conduction through the cylinder head body. Thermal stress from the combustion pressure escalates mechanical loading on the combustion chamber, and may result in cracking. Limiting combustion temperatures to decrease thermal stressing of the combustion chamber can limit the efficiency of the combustion event and thereby limit the fuel economy which may otherwise be achieved by the engine.

SUMMARY

Increasing the combustion temperature in the combustion chamber increases the efficiency of the combustion event due to a more complete burning of the air-fuel mixture and the fuel efficiency of the machine powered by the engine, which may be, for example, a vehicle. A preform defining a surface of a combustion chamber of an internal combustion engine is provided. The preform may be configured as an insert included in a cylinder head casting formed by a method provided herein. The preform is configured to provide a combustion surface having increased resistance to thermal fatigue relative to a cast portion of the cylinder head, and to retain the mechanical properties at the combustion surface at higher operating temperatures relative to the cast portion of the cylinder head. The cylinder head, including the preform, may be configured for use with any type of engine defining a combustion chamber, which may include a gasoline, diesel or alternative fuel engine which includes but is not limited to ethanol, methanol, biofuels and gaseous fuels such as LPG and CNG.

A method of forming a cylinder head having a cylinder head casting including a preform and a cast portion is provided. The method includes forming a preform defining a portion of a combustion chamber including a combustion surface. The preform is made from a multi-layer composite material which may be a clad material. The clad material includes a first layer made of a first material, a second layer made of a second material different from the first material, and a first bonded interface therebetween. The first bonded interface may be characterized by a metallurgical bond formed between the first and second layers, which may be formed by diffusion welding the first and second layers during cladding of the composite material. The method includes positioning the preform in a die cavity of a casting die configured to form the cast portion of the cylinder head, such that the preform is positioned with the second layer in communication with the die cavity, e.g., the second layer is exposed to or interfaces with the die cavity, and with the first layer, which defines the combustion surface, is facing outwardly from the die cavity. A cylinder head casting is formed by providing a molten casting material to the die cavity such that the molten casting material is in fluid communication with the second layer of the preform, and solidifying the molten casting material to form a cast portion, and to form a second bonded interface between the cast portion and the second layer of the preform. The second bonded interface is characterized by a metallurgical bond between the cast portion and the second layer, which may be formed by partial melting of the second layer of the preform and solidification of the melted portion of the second layer and the molten casting material during the casting process.

The preform may include a plurality of apertures, and the cast portion of the cylinder head casting may be formed to include a plurality of passages, such that each aperture is in fluid communication with a respective passage to define at least one inlet port and one outlet port of the cylinder head. In one example, the preform may include a dome-shaped portion defining the combustion surface and including a plurality of apertures. In another example, the preform may be generally shaped as a sheet including a plurality of apertures and configured to define a face of the cylinder head.

The material of the first layer may have a higher melting temperature than the material of the second layer and the cast portion, such that the first layer including the combustion surface is characterized by a higher thermal fatigue strength than the second layer or cast portion of the cylinder head and is configured to sustain higher combustion temperatures than a cylinder head including a combustion surface made of the as-cast material of the cast portion. In one example, the first layer of the preform is made of a steel-based material such as a stainless steel or carbon steel, and the second layer and cast portion are made of aluminum-based materials.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic partial cross-sectional view of a casting die including a die insert and configured to form a cylinder head casting of the cylinder head assembly of FIG. 1;

FIG. 4A is a perspective bottom view of the preform of FIGS. 1-3;

FIG. 4B is a schematic cross-sectional view of section 4B-4B of the multilayer material of the preform;

FIG. 5 is a perspective top view of the die insert of FIG. 3;

DETAILED DESCRIPTION

Figure 1:
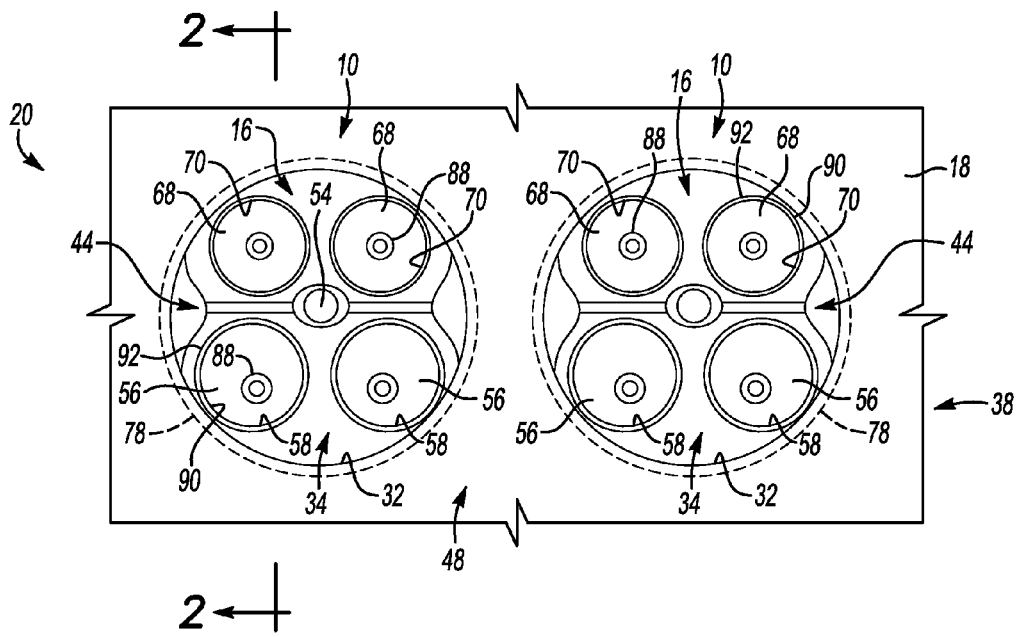
FIG. 1 is a schematic partial plan view of a cylinder head assembly including a preform defining a combustion chamber of the cylinder head.
Figure 2:
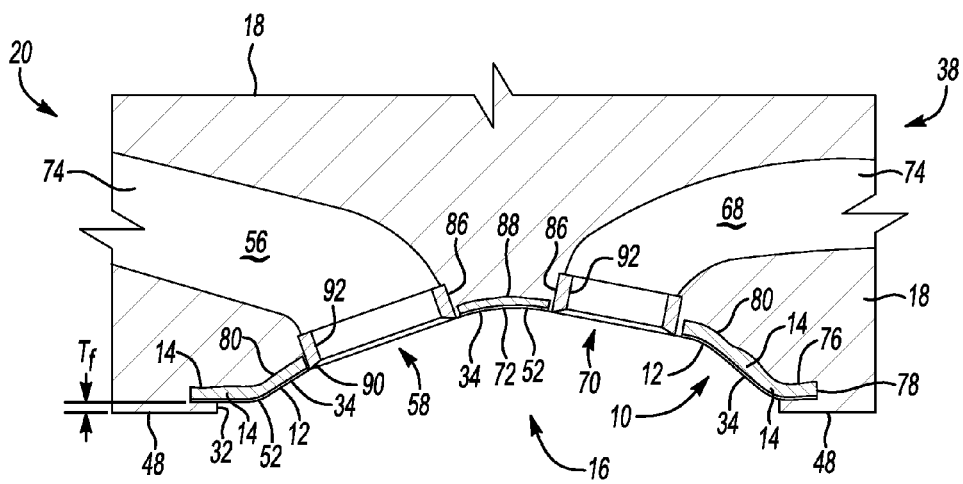
FIG. 2 is a schematic partial cross-sectional view of section 2-2 of the combustion chamber of the cylinder head of FIG. 1.

Referring to the drawings wherein like reference numbers represent like components throughout the several figures, the elements shown in FIGS. 1-8 are not to scale or proportion. Accordingly, the particular dimensions and applications provided in the drawings presented herein are not to be considered limiting. FIG. 1 shows a partial plan view of a cylinder head assembly generally indicated at 20. FIG. 2 shows a cross-sectional view of section 2-2 of the cylinder head assembly 20 of FIG. 1. The cylinder head assembly 20 may be configured for use with any type of engine defining a combustion chamber, which may include, for example, a gasoline, diesel, or alternative fuel engine. In a non-limiting example, the cylinder head casting 38 shown in FIGS. 1-2 including the preform 10 shown in FIGS. 4A-4B at least partially defines a generally dome-shaped portion 44 of a combustion chamber 16 which may be used in a gasoline engine. The cylinder head casting 38 shown in FIGS. 1-2 defines a plurality of combustion chambers 16, and includes a plurality of preforms 10 wherein each of the plurality of preforms 10 defines a combustion surface 34 of a respective one of the plurality of combustion chambers 16.

Referring to FIGS. 1 and 2, the cylinder head 20 includes a cylinder head casting 38. The cylinder head casting 38 includes a cast portion 18 including a preform 10. The preform 10 is configured to define a combustion surface 34 of a combustion chamber 16 formed by the cylinder head 20. In the configuration shown in FIG. 1 and as shown in further detail in FIG. 2, a perimeter portion 76 adjacent a perimeter edge 78 of the preform 10 is embedded in the cast portion 18 of the cylinder head 20, such that a cylinder head face 48 and a combustion chamber aperture 32 is defined by the cast portion 18, and the combustion surface 34 is defined by the preform 10.

The cylinder head casting 38 may include a plurality of passages 74 in fluid communication with apertures 22 (see FIG. 4A) defined by the preform 10 to provide a plurality of ports. The apertures 22 may be configured, as shown in FIGS. 1-4 and 6A-7B, to provide various types of ports, including inlet ports 56, outlet ports 68, injector ports 54, coolant ports 36, oil passages 46, and/or bolt holes 24, by way of non-limiting example. As shown in FIGS. 1-4, a passage 74 (FIG. 2) may be in fluid communication with an inlet port aperture 58 defined by the preform 10 to provide an inlet port 56 in the cylinder head casting 38. Another passage 74 may be in fluid communication with an outlet port aperture 70 to provide an outlet port 68. As will be described in further detail, the portion of the casting 38 defining the passage 74 may be configured to provide bore stock 26 adjacent to and accessible via the inlet and outlet port apertures 58, 70 which may be modified by a machining, boring, or other finishing method to define a valve bore 86 configured to receive a valve seat insert 92, as shown in FIGS. 2-3. The valve seat insert 92 may define a valve seat 90 configured to sealably interface with a valve (not shown) of the cylinder head assembly 20. The cylinder head assembly 20 may further include at least one valve guide 88 configured to position the valve relative to the valve seat 90 and the port 56, 68. Not shown but understood, other methods for defining a valve seat 90 may be used which may not require assembling a valve seat insert 92 as a separate component. For example, the bore stock 26 may be machined, ground, drawn, or otherwise finished to define the valve seat 90.

Referring now to FIGS. 2-4B, the preform 10 may be made of a multi-layer composite material which may be a clad material. As shown in FIGS. 2, 3 and 4B, the clad material may include a first layer 12 made of a first material, a second layer 14 made of a second material different from the first material, and a first bonded interface 52 therebetween which may be formed, for example, by roll bonding the first and second layers 12, 14. In one example, the first bonded interface 52 may be formed by diffusion welding the first and second layers during a cladding of the composite material. The first bonded interface 52 may be characterized by a metallurgical bond formed between the first and second layers 12, 14. The first layer 12 defines an outwardly facing surface 72 which is outwardly facing relative to the cast portion 18 and which defines an outermost surface of the cylinder head casting 38. The outwardly facing surface 72 includes a combustion surface 34 of a combustion chamber 16, where the combustion chamber 16 is at least partially defined by the cylinder head casting 38. The second layer 14 defines an inwardly facing surface 60 which interfaces with the cast portion 18 of the cylinder head casting 38 to form the first bonded interface 52.

The material of the first layer 12 may have a higher melting temperature than the material of the second layer 14, such that the first layer 12 is characterized by a higher resistance to thermal stress and fatigue relative to the second layer 14. Further, the material of the first layer 12 may have a higher melting temperature than the cast material 66 forming the cast portion 18, such that the first layer 12 provides a combustion chamber surface which has increased resistance to thermal stress and fatigue in comparison with the cast portion 18 of the cylinder head 20. As so configured, the combustion chamber 16 defined by the preform 10 can be exposed to substantially higher combustion temperatures relative to an as-cast combustion chamber (not shown) cast from a molten casting material 66 having a lower melting temperature than the first material. In one example, the first material of the first layer 12 may be a steel or stainless steel material, and the second material of the second layer 14 may be an aluminum-based material. The cast portion 18 may be formed from the molten casting material 66, which may be an aluminum based material. During the casting process, a second bonded interface 80 is formed between the cast portion 18 and the second layer 14. The second bonded interface 80 may be characterized by a metallurgical bond between the cast portion 18 and the second layer 14.

The first layer 12 may be configured as a thinner layer relative to the thickness of the second layer 14, to facilitate heat transfer through the first layer 12 to the second layer 14 and through the cast portion 18 to the coolant ports 36 (see FIGS. 7A-7B, not shown in FIG. 1 for simplicity of illustration) defined by the cylinder head casting 38. The first layer 12 may have a lower thermal conductivity than the second layer 14, and the thinness of the first layer 12 may be defined based on the thermal conductivity of the first material forming the first layer, to provide a first layer 12 which is sufficiently thin to effectively conduct heat through the first layer 12, and/or not inhibit thermal conductivity of heat from the combustion chamber 16 to the cast portion 18.

The second layer 14 may be of sufficient thickness such that the second layer 14 is partially and not fully melted during the casting process forming the cylinder head casting 38, as described in further detail herein, and such that the first bonded interface 52 is substantially unaffected, e.g., remains metallurgically intact, through the casting process forming the cylinder head casting 38. By retaining the integrity of the first bonded interface 52 between the first layer 12 and the second layer 14, the bond strength and resistance to thermal stress between the clad layers 12, 14 is maintained in the cylinder head assembly 20.

In the example shown in FIGS. 1-4A, the preform 10 may be formed to define a generally dome-shaped portion 44 of the combustion chamber 16. As shown in FIG. 1, a plurality of preforms 10 may be included in the cylinder head casting 38, where each preform 10 at least partially defines the combustion chamber 16 of a cylinder head assembly 20. Each preform 10 shown in FIGS. 1-4B may be formed from a composite sheet including a first layer 12 and second layer 14 formed by cladding the first and second layers 12, 14 together to form the first bonded interface 52. The preform 10 may be formed by blanking, stamping, or otherwise deforming the composite sheet to form the preform 10. One or more of the apertures 22 of the preform 10 may be formed during the blanking or stamping process or by machining, cutting or otherwise forming the apertures 22 in the composite sheet before or after the blanking or stamping process forming the generally domed-shaped preform 10.

Figure 6A:
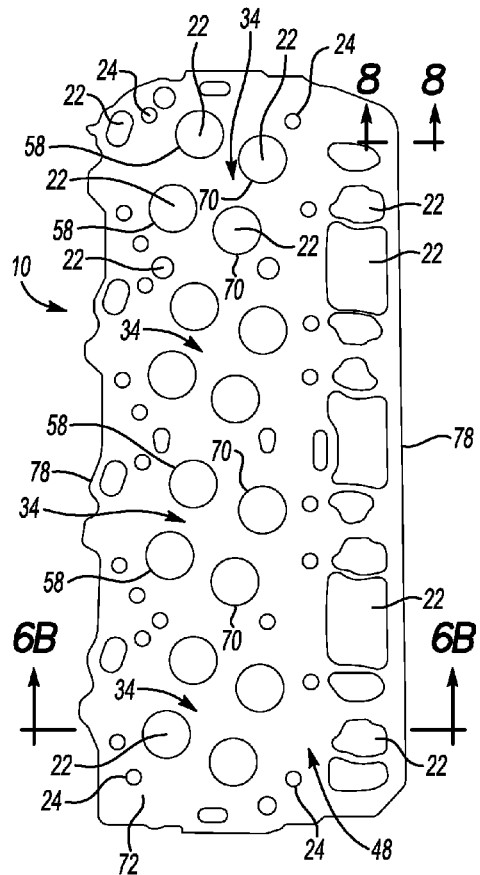
FIG. 6A is a schematic bottom view of a preform configured for inclusion in a cast diesel cylinder head.
Figure 6B:
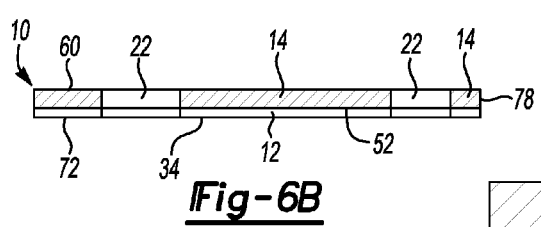
FIG. 6B is a schematic cross-sectional view of section 6B-6B of the preform of FIG. 6A.

In another example shown in FIGS. 6A-6B, the preform 10 may be configured as a substantially flat sheet defining a plurality of apertures 22 which may include, for example, one or more of an inlet port aperture 58, and an outlet port aperture 70. Each of the apertures 22 of the preform 10 may be configured to be in fluid communication with a passage 74 defined by the cast portion 18 of the cylinder head casting 38 shown in FIGS. 7A-7B to define one or more of an inlet port 56, an outlet port 68, a coolant port 36, and/or an oil passage 46.

The configurations shown in FIGS. 1-4B and 6A-7B are not intended to be limiting. For example, the preform 10 shown in FIG. 6A may define an additional aperture 22 configured to be in communication with an injector or spark plug port 54 not shown. The preform 10 may define a plurality of combustion surfaces 34, each of which correspond to a combustion chamber 16 defined by the cylinder head casting 38, as shown in FIGS. 6A-7B. For example, the preform 10 may be a substantially flat sheet which is formed from a composite sheet by blanking, stamping, cutting, etc. One or more of the apertures 22 may be formed concurrently during forming of the preform 10 from the multi-layer composite sheet by stamping or blanking, or formed in a subsequent process by stamping, cutting, drilling, or otherwise modifying the preform 10 to fabricate the apertures 22. The perimeter edge 78 of the preform 10 shown in FIGS. 6A-7B may be configured to be substantially coextensive with the face of the cylinder head casting 38, such that the preform 10 may be configured to define the face 48 of the cylinder head 20. In this configuration, the preform 10 may provide a cylinder head face 48 which provides a sealing surface for the cylinder head assembly 20 which requires little or no additional finishing (machining, polishing, grinding, etc.). As described previously, the first layer 12 of the preform 10 may be relatively thinner than the second layer 14, to facilitate heat transfer from the combustion chamber 16 through the first layer 12 to the second layer 14, the cast portion 18, and the coolant ports 36 during engine operation.

Referring now to FIGS. 3-5, a method of forming the cylinder head casting 38 includes positioning the preform 10 in a die cavity 40 of a casting die 30. The casting die 30 is configured to form the cast portion 18 of the cylinder head casting 38. The preform 10 is positioned in the die cavity 40 with the second layer 14 in communication with the die cavity 40, and with the first layer 12 facing outwardly from the die cavity 40, as shown in FIG. 3. As positioned, the inwardly facing surface 60 of the second layer 14 is in fluid communication with molten casting material 66 introduced into the die cavity 40, and the outwardly facing surface 72 of the first layer 12, e.g., the surface of the first layer 12 defining the combustion surface 34, is isolated or separated from the die cavity 40 such that during the casting process the combustion surface 34 defined by the first layer 12 is not in contact with the molten casting material 66.

The cylinder head casting 38 is formed by providing molten casting material 66 to the die cavity 40 such that the molten casting material 66 is in fluid communication with the inwardly facing surface 60 of the second layer 12 of the preform 10. The second layer 14 may be partially melted by the molten casting material 66, such that a portion of the second layer 14 and the molten casting material 66 solidify to form a second bonded interface 80 between the cast portion 18 and the second layer 14 of the preform 10 upon cooling of the cast cylinder head 38. The second bonded interface 80 may be characterized by a metallurgical bond between the cast portion 18 formed by solidification of the molten cast material 66 and the second layer 14. The second layer 14 is configured such that the second layer 14 is not fully melted during the casting process forming the cast portion 18 and the first bonded interface 52 between the second layer 14 and the first layer 12 remains intact, e.g., the metallurgical bond between the first and second layers 12, 14 is substantially unchanged.

Figure 8:
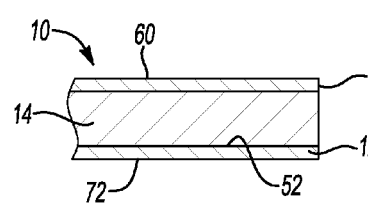
FIG. 8 is a schematic cross-sectional view of section 8-8 of the preform of FIGS. 4A and 6A, showing an alternative configuration of the multilayer material.

As shown in FIG. 8, in another example configuration, the preform 10 may be formed from a multi-layer composite material including the first layer 12 made of a first material, the second layer 14 made of a second material different from the first material, and a third layer 82 made from a third material, wherein the second layer 14 is between the first and third layers 12, 82. As previously described, the first layer 12 preferably has a higher melting temperature than the second layer 14, such that the first layer 12 is characterized by higher resistance to thermal stress and fatigue than the second layer 14. The third layer 82 may be made from a material having a melting temperature less than the melting temperature of the second layer 14. The third layer 82 may be, in one example, made from a zinc-based material such that the third layer 82 prevents oxidation of the second layer 14 of the preform 10, and facilitates formation of the second bonded interface 80 during the casting process forming the cylinder head casting 38. The third layer 82 may be configured as a sacrificial layer which is melted and/or dissolved by the molten casting material 66 during forming of the cylinder head casting 38. During the casting process, the third material of the third layer 82 may form an intermetallic with at least one of the second material of the second layer 14 and the cast material of the cast portion 18, such that the second bonded interface 80 may be characterized by a metallurgical bond including one or more intermetallics.

Referring again to FIGS. 2-5, the method may include providing a die insert 42 (see FIGS. 3 and 5) in communication with the die cavity 40, where the die insert 42 is configured to locate the preform 10 relative to the die cavity 40. In the example shown in FIGS. 3 and 5, the die insert 42 may include one or more locating features 62 configured to locate the preform 10 with respect to the die cavity 40. In the example shown in FIG. 5, the locating features 62 are configured as raised or protruding portions of the die insert 42 configured to correspond with respective apertures 22 of the preform 10 shown in FIG. 4A, such that when the preform 10 is positioned on the die insert 42, each locating feature 62 protrudes through a respective aperture 22 as shown in FIG. 3 to substantially prevent the flow of molten casting material 66 through the aperture 22, thereby preventing the flow of molten casting material 66 onto the combustion surface 34 (see FIG. 2) during the casting process.

The die insert 42 may include a locating surface 64 configured to substantially conform to the combustion surface 34 defined by the outwardly facing surface 72 of the first layer 12 of the preform 10. As shown in FIG. 3, the preform 12 is in operative contact with the die insert 42 such that flow of the molten casting material 66 between the locating surface 64 of the die insert 42 and the combustion surface 34 of the preform 10 is substantially prevented. The combustion surface 34, which remains unexposed to the molten casting material 66, defines an outer surface of the cylinder head casting 38.

In the example shown in FIGS. 1-4A, the combustion surface 34 may be defined by a dome-shaped portion 44 of the preform 10, which conforms to the substantially dome-shaped locating surface 64 of the die insert 42. The term "dome-shaped" is used herein to describe a generally concave portion of the preform 10, such that when the preform 10 is positioned relative to the die cavity 40 and incorporated into the cylinder head casting 38, the preform 10 defines a generally concave combustion chamber 16 including a generally concave combustion surface 34. The example of the dome-shaped portion 44 shown in FIGS. 1-5 is not intended to be limiting, and the dome-shaped portion 44 may be symmetrical, non-symmetrical, semi-spherical or irregular. The dome-shaped portion 44 may be provided with no apertures, or may define one or more apertures 22, which may be configured, for example, as inlet port apertures 58, outlet port apertures 70, injector or spark plug ports 54, or a combination of these.

As shown in FIG. 3, the die insert 42 may be configured to receive the preform 10 such that a perimeter portion 76 of the preform 10 protrudes into the die cavity 40. The perimeter portion 76, as shown in FIG. 4A, is generally identified as the portion of the preform 10 immediately adjacent the perimeter edge 78 of the preform 10. In the example shown in FIG. 3, the perimeter portion 76 extends into the die cavity 40 such that the molten casting material 66 is in fluid communication with and surrounds the perimeter portion 76 to encase or enclose the perimeter portion 76 and perimeter edge 78 in the cast portion 18 upon solidification of the molten casting material 66 to form the cylinder head casting 38.

In the example shown in FIGS. 2-3, the die insert 42 and/or the preform 10 may be configured such that the cast portion 18 is formed to define an as-cast face 28 including a face stock portion 50 having an as-cast thickness Tc. As shown in FIG. 2, the as-cast face stock portion 50 may be reduced in thickness to a finished thickness Tf to define a cylinder head face 48, by subsequent processing of the cylinder head casting 38. For example, the cylinder head casting 38 may be machined, broached, ground, polished or otherwise finished to remove a portion of the face stock portion 50 to provide the cylinder head face 48. The cylinder head face 48 may be configured as a sealing face of the cylinder head assembly 20 which may be characterized a flatness and/or surface finish as required for assembly to another engine component. For example, the face 48 may be finished with sufficient flatness and/or surface finish to be in sealable contact with a head gasket or other sealing element interposed between the cylinder head face 48 and an engine block (not shown). By embedding the perimeter portion 76 of the preform 10 in the cast portion 18 and providing the face stock portion 50, the cylinder head face 48 may be defined by finishing the cast material portion 18 only.

In another example, the die cavity 40 may be configured to provide the features defined by the die insert 42, which may include the locating features 62 and/or the locating surface 64, arranged to receive the preform 10. The die cavity 40 thus configured would substantially prevent the flow of molten casting material onto the combustion surface 34 of the preform 10 during the casting process, and/or provide for the formation of as-cast bore stock portions 26 and/or face stock portions 50.

The method may include providing one or more die cores 94 to the die cavity 40, as shown in FIG. 3. The die core 94 may be configured to form a respective passage 74 of the cylinder head casting 38. The die core 94 may be, for example, a sand core or other disposable core, or may be of other known configuration suitable for forming a passage 74 of the cylinder head casting 38. The die core 94 may be configured, as shown in FIG. 3, such that the cast portion 18 is formed to include a bore stock portion 26 which is accessible via the aperture 22. As shown in FIG. 2, the as-cast bore stock portion 26 may be subsequently processed to define a valve bore 86, for example, by machining, grinding or otherwise finishing the bore stock portion 26. The valve bore 86 may be configured to receive a valve seat insert 92, which may be press fit or otherwise operatively attached to the valve bore 86. In another example (not shown), the bore stock portion 26 may be finished to define the valve seat 90, thus avoiding the need to assemble a valve seat insert 92 as a separate component to the cylinder head assembly 20. The aperture 22 allows the as-cast bore stock portion 26 and the passage 74 to be accessed for further processing via the aperture 22 without modifying the preform 10.

The method may include forming the preform 10 from a multi-layer composite material, which may be a clad material. The multi-layer composite material, as previously described, may include a first layer 12 made of a first material, and a second layer 14 made of a second material which is different from the first material. The first and second layers 12, 14 may be joined to define a first bonded interface 52 therebetween. In one example, the method includes forming the multi-layer composite material by cladding the first and second layers 12, 14 together, which may be performed by roll bonding and/or diffusion welding the first and second layers 12, 14 to form the first bonded interface 52. The multi-layer composite material may be provided as a generally flat sheet and subsequently processed to form the preform 10. For example, the dome-shaped preform 10 shown in FIGS. 1-4 may be formed by deforming the generally flat multi-layer sheet by stamping, extruding, blanking or otherwise deforming the sheet to shape the preform 10. One or more apertures 22 may be formed in the preform 10 prior to, during or subsequent to forming the preform 10 from the generally flat sheet. For example, one or more of the apertures 22 may be blanked, stamped, or machined from the generally flat sheet prior to deforming the sheet to form the generally dome-shaped portion 44. In another example, one or more of the apertures 22 may be formed concurrently with formation of the dome-shaped portion 44, in the process of blanking or stamping the preform 10. One or more of the apertures 22 may be formed after forming the cylinder head casting 38, for example, by machining the aperture 22, which may include machining the cast portion 18 adjacent the aperture 22 to define, for example, one or more of a valve bore 86, injector port 54, and/or passage 74.

Figure 7A:
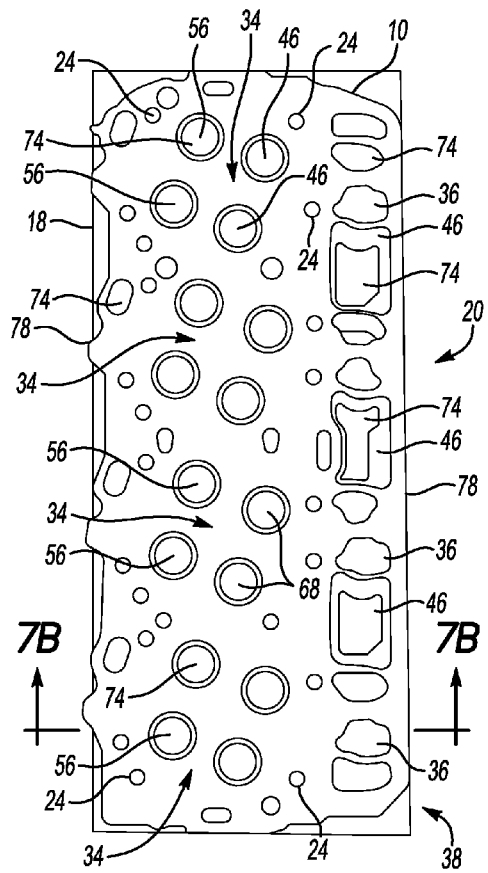
FIG. 7A is a schematic plan view of a diesel cylinder head casting including the preform of FIG. 6A.
Figure 7B:
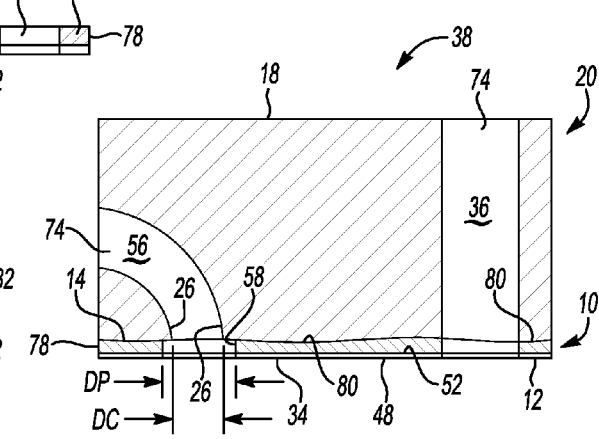
FIG. 7B is a schematic cross-sectional view of section 7B-7B of the diesel cylinder head casting of FIG. 7A.

Referring now to FIGS. 6A-7B, the cylinder head casting 38 may be configured as shown in FIGS. 7A-7B, including a preform 10 and a cast portion 18. In a non-limiting example, the preform 10 shown in FIGS. 7A-7B at least partially defines a plurality of combustion surfaces 34, where each of the combustion surfaces 34 may partially define a respective combustion chamber 16 of an engine (not shown) including the cylinder head 20. In the non-limiting example shown in FIGS. 7A-7B, the cylinder head 20 may be configured for use in a diesel engine. The preform 10 may be formed as a substantially flat sheet as shown in FIGS. 6A-6B defining a plurality of apertures 22 in fluid communication with a respective plurality of passages 74 defined by the cast portion 18 of the cylinder head casting 38. In the example shown, the combustion surface 34 defined by the first layer 12 of the preform 10 may be configured as a generally flat surface, such that the first layer 12 may define a cylinder head face 48 including the plurality of combustion surfaces 34. In the example shown in FIG. 7B, the perimeter edge 78 of the preform 10 is substantially coextensive with the cast portion 18 to define the cylinder head face 48. The preform 10 may be characterized by a predetermined flatness and/or surface finish such that the first layer 12 of the preform 10 provides a cylinder head face 48 of the cylinder head assembly which is substantially finished, e.g., which requires no additional machining, polishing, or other further processing to provide a cylinder head face 48 of sufficient flatness and/or smoothness, for example, to sealably interface with another engine component such as an engine block face (not shown) or a cylinder head gasket (not shown).

The combustion chamber 16 may further comprise a plurality of ports including at least one inlet port 56 and at least one outlet port 70. As previous described, the inlet port 56 may be defined by an aperture 22 formed in the preform 10 in fluid communication with a passage 74 defined by the cast portion 18. The passage 74 may be formed during the casting of the cast portion 18, by machining or otherwise removing a portion of the cast portion 18, or by a combination of these. The preform 10 may be stamped, machined or otherwise processed to form one or more of the apertures 22 prior to inserting the preform 10 into the casting die cavity 40 configured to form the cylinder head casting 38 of FIG. 7A. In another example, one or more of the apertures 22 may be formed by machining the preform 10 after casting the cylinder head casting 38 including the preform 10.

The cylinder head casting 38 shown in FIGS. 7A-7B may be formed by the method previously described herein, where for example the preform 10 shown in FIGS. 6A-7A is positioned in a die cavity 40 of a casting die 30. The die cavity 40 (not shown) is configured to form the cast portion 18 of the cylinder head casting 38 shown in FIGS. 7A-7B. The preform 10 is positioned in the die cavity 40 with the second layer 14 in communication with the die cavity 40, and with the first layer 12 facing outwardly from the die cavity 40. As positioned, the inwardly facing surface 60 (see FIG. 7B) of the second layer 14 is in fluid communication with molten casting material 66 introduced into the die cavity 40, and the outwardly facing surface 72 of the first layer 12, e.g., the surface of the first layer 12 defining the combustion surface 34, is isolated or separated from the die cavity 40 such that during the casting process the combustion surface 34 defined by the first layer 12 is not in contact with the molten casting material 66.

The cylinder head casting 38 is formed by providing molten casting material 66 to the die cavity 40 such that the molten casting material 66 is in fluid communication with the inwardly facing surface 60 of the second layer 12 of the preform 10. The second layer 14 may be partially melted by the molten casting material 66, such that a portion of the second layer 14 and the molten casting material 66 solidify to form a second bonded interface 80 between the cast portion 18 and the second layer 14 of the preform 10 upon cooling of the cast cylinder head 38. The second bonded interface 80 may be characterized by a metallurgical bond between the cast portion 18 formed by solidification of the molten cast material 66 and the second layer 14. The second layer 14 is configured such that the second layer 14 is not fully melted during the casting process forming the cast portion 18 and the first bonded interface 52 between the second layer 14 and the first layer 12 remains intact, e.g., the metallurgical bond between the first and second layers 12, 14 is substantially unchanged.

The die cavity 40 may be configured to receive the preform 10 such that the perimeter edge 78 of the preform 10 substantially conforms to a perimeter of the die cavity 40 (not shown) such that the perimeter edge 78 of the preform is coextensive with the perimeter edge of the cast portion 18 of the cylinder head casting 38, and such that the molten casting material 66 is prevented from flowing around the perimeter edge 78 onto the outwardly facing surface 72 of the preform 10 during the casting process.

The die cavity 40, or a die insert 42 (not shown) provided to the die cavity 40 may be configured to include locating features 62 and/or a locating surface 64, arranged to receive the preform 10. The die cavity 40 thus configured would substantially prevent the flow of molten casting material onto the combustion surface 34 of the preform 10 during the casting process, and/or provide for the formation of as-cast bore stock portions 26. One or more die cores 94 may be provided to the die cavity 40, as previously described, to form a respective passage 74 of the cylinder head casting 38 in fluid communication with a respective aperture 22 defined by the preform 10. The die core 94 may be configured such that the cast portion 18 is formed to include a bore stock portion 26 which is accessible via the aperture 22, as shown in FIG. 7B, where the diameter (or other defining dimension) DC of the passage 74 including the bore stock portion 26 is less than the diameter (or other defining dimension) DP of the aperture 22 in fluid communication with the passage 74, such that the bore stock portion 26 and/or the cast portion 18 defining the passage 74 is accessible via the aperture 22 for further processing, including, for example, machining of a valve bore 86.

While the best modes for carrying out the invention have been described in detail, those familiar with the art to which this invention relates will recognize various alternative designs and embodiments for practicing the invention within the scope of the appended claims.

The invention claimed is:

1. A method of forming a cylinder head including a cast portion, the method comprising:
   providing a preform defining a portion of a combustion chamber;
   wherein the preform is made of a composite material including a first layer made of a first material, a second layer made of a second material different from the first material, and a first bonded interface therebetween;
   wherein the first layer defines a combustion surface of the combustion chamber;
   positioning the preform in a die cavity of a casting die configured to form the cast portion of the cylinder head, wherein the preform is positioned such that the second layer is exposed to the die cavity and the first layer is in contact with the casting die;
   forming a cylinder head casting by:
      providing a molten casting material to the die cavity such that the molten casting material is in fluid communication with the second layer of the preform; and
      solidifying the molten casting material to form a cast portion and to form a second bonded interface between the cast portion and the second layer of the preform; and
   wherein the second bonded interface is characterized by a cast microstructure including the casting material and the second material;

the second bonded interface forming a metallurgical bond between the cast portion and the second layer.

2. The method of claim 1, wherein:
the composite material is formed by a cladding process; and
the first bonded interface is characterized by a metallurgical bond between the first layer and the second layer.

3. The method of claim 1, further comprising:
partially melting a portion of the second layer in fluid communication with the molten casting material such that the cast portion includes the portion of the second layer; and
wherein the second layer is of sufficient thickness such that the second layer adjacent the first bonded interface remains solidified during forming of the cylinder head casting.

4. The method of claim 1, the method further comprising:
deforming the composite material to form the preform including a generally dome-shaped portion;
wherein the generally dome-shaped portion defines the combustion surface.

5. The method of claim 1, wherein:
forming the cylinder head casting includes forming a plurality of passages in the cast portion;
the preform defines a plurality of apertures; and
at least one of the plurality of apertures is configured as a passage opening in fluid communication with a respective one of the plurality of passages.

6. The method of claim 5, wherein the cast portion includes bore stock configured to be accessed via the aperture, the method further comprising:
removing a portion of the bore stock to define one of a valve bore and a valve seat within the aperture.

7. The method of claim 1, wherein:
the first material has a higher melting temperature than the second material; and
the casting material has a melting temperature less than the melting temperature of the first material.

8. The method of claim 1, wherein the casting material is an aluminum-based material, the first material is a steel-based material, and the second material is an aluminum-based material.

9. The method of claim 1, wherein:
the preform includes a third layer made of a third material; and
the second layer is between the first layer and the third layer.

10. The method of claim 1, further comprising:
providing a die insert in communication with the die cavity and configured to receive the preform; and
wherein the die insert includes at least one locating feature configured to locate the preform relative to the die cavity.

11. The method of claim 1, wherein the die insert includes a locating surface which substantially conforms to the combustion surface defined by the first layer such that flow of molten material between the die insert and the combustion surface of the preform during forming of the cylinder head casting is substantially prevented.

12. The method of claim 10, wherein the die insert is configured to position the preform in the die cavity such that a perimeter portion of the preform is embedded in a cast portion of the cylinder head.

13. A cylinder head comprising: a cylinder head casting including: a cast portion made of a casting material; a preform defining a portion of a combustion chamber; the preform made of a clad composite material including a first layer made of a first metallic material metallurgically bonded to a second layer made of a second metallic material to form a first bonded interface therebetween; a second bonded interface defined by a cast microstructure including the casting material and the second metallic material; the second bonded interface forming a metallurgical bond between the cast portion and the second layer of the preform; and wherein a surface of the first layer of the preform defines a combustion surface of the portion of the combustion chamber defined by the cylinder head preform; wherein the second layer is intermediate the first layer and the cast portion; wherein casting the cylinder head casting includes positioning the preform in a die cavity of a casting die configured to form the cast portion of the cylinder head; and wherein the preform is positioned such that the second layer is exposed to the die cavity and the first layer is in contact with the casting die.

14. The cylinder head of claim 13, wherein the cylinder head defines a plurality of combustion chambers, the cylinder head further comprising:
a plurality of preforms;
wherein each of the plurality of preforms is generally dome-shaped; and
wherein each of the plurality of preforms is configured to define a combustion surface of a respective one of the plurality of combustion chambers.

15. The cylinder head of claim 14, wherein the outer perimeter portion of each of the plurality of preforms is enveloped by the cast portion of the cylinder head.

16. The cylinder head of claim 13, wherein:
the preform is generally configured to define a face of the cylinder head.

17. The cylinder head of claim 13, wherein:
the cast portion defines a plurality of passages;
the preform defines a plurality of apertures; and
at least one of the plurality of apertures is in fluid communication with a respective one of the plurality of passages.

18. The cylinder head of claim 17, wherein the plurality of passages includes an inlet port and an outlet port; and
the plurality of apertures includes an inlet port aperture in communication with the inlet port and an outlet port aperture in communication with the outlet port.

19. The cylinder head of claim 13, further comprising:
a cylinder head face defined by the first layer of the preform;
wherein the cylinder head includes a second combustion chamber; and
wherein the surface of the first layer of the preform defines a second combustion surface of the second combustion chamber.

20. The cylinder head of claim 13, wherein:
the preform includes a third layer made of a third metallic material having a melting temperature less than the melting temperature of the second metallic material;
wherein the second layer is between the first layer and the third layer; and
the cast microstructure includes the third metallic material.

* * * * *